Sept. 4, 1934. C. W. VOGT 1,972,253
PROCESS AND APPARATUS FOR PREPARING AND PACKING FOOD PRODUCTS
Original Filed Dec. 27, 1927
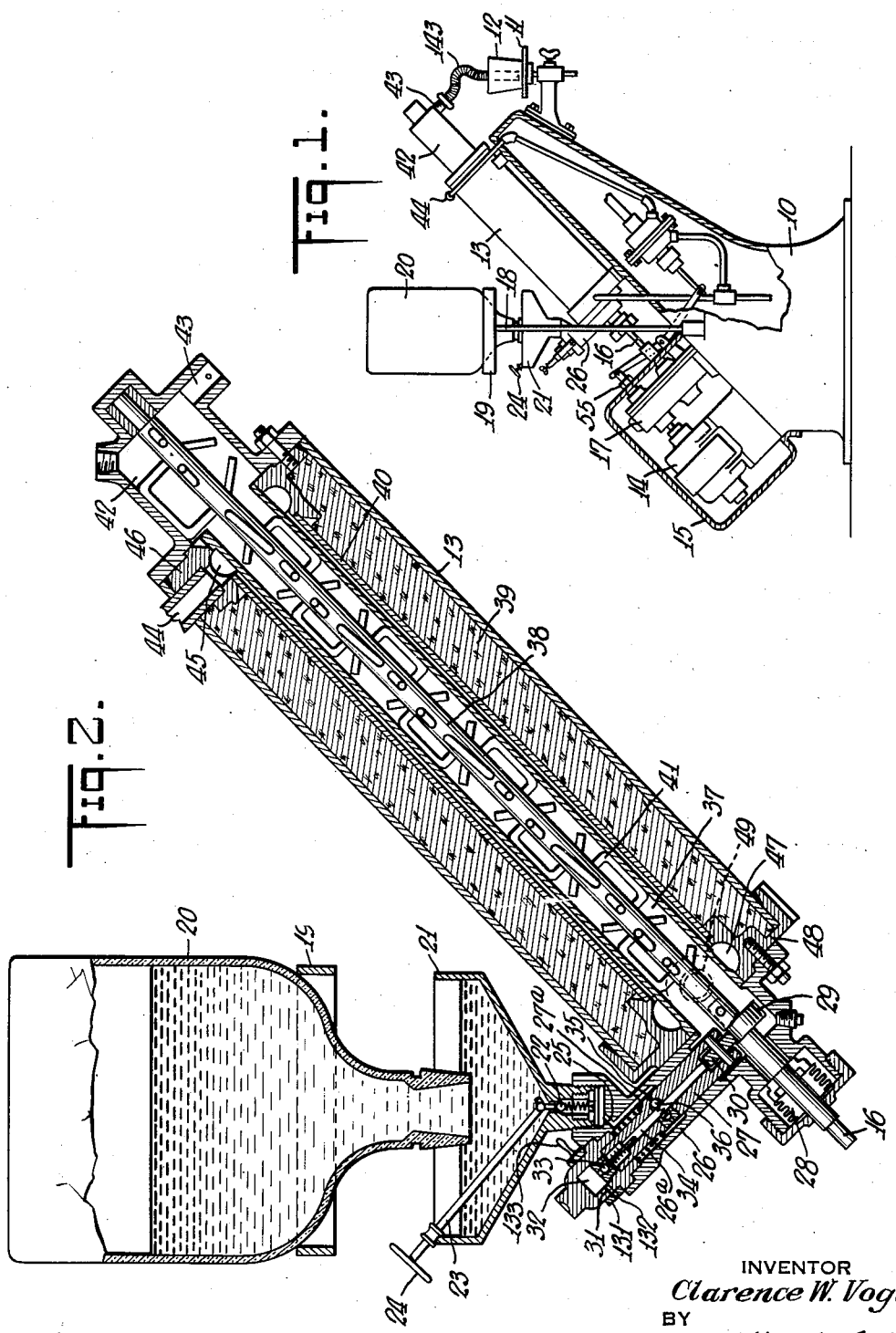
INVENTOR
Clarence W. Vogt
BY
ATTORNEYS Patented Sept. 4, 1934

1,972,253

UNITED STATES PATENT OFFICE 1,972,253

PROCESS AND APPARATUS FOR PREPARING AND PACKING FOOD PRODUCTS

Clarence W. Vogt, Louisville, Ky., assignor, by mesne assignments, to Vogt Processes Incorporated, Louisville, Ky., a corporation of Delaware Original application December 27, 1927, Serial No. 242,667. Divided and this application October 28, 1930, Serial No. 491,654

4 Claims. (Cl. 62—174)

This invention relates to a process and apparatus for preparing, including packing, of ice cream, sherbets, fruit juices, eggs, vegetable oils, salves and other plastic or semi-plastic materials. This present application is a division of my prior application Serial No. 242,667, filed Dec. 27, 1927.

The principal object of the invention is to provide an improved process and apparatus by means of which such materials may be effectively agitated while being chilled or frozen and the resulting product in a substantially stiff-non-fluent state is delivered into the containers in which it is to be stored and/or sold. The invention also includes a method and means for delivering such product into such container in such a manner as to prevent the encasement of air pockets (hereinafter referred to as "voids"), or undue exposure of the material to surrounding atmosphere between the time of the chilling or freezing and the deposition of the product into containers.

In the packing of ice cream and other similar frozen confections in a container, it is highly important that such material be packed without voids since such material is usually sold by volume. The prevention of voids has not heretofore been considered a problem since the types of combined freezing and agitating apparatus in general used in the industry have been of the batch or atmospheric pressure type, in which gravity was mainly depended upon for the discharge of the readily flowable product therefrom. Such apparatus will not satisfactorily discharge a product frozen to the stiffness readily obtainable by the use of the process and apparatus disclosed in my hereinbefore mentioned patent. Heretofore all ice cream freezers have been equipped with open spouts or large orifices not connected in closed circuit or by a closed passage with the container into which the product was dropped or discharged. While several types of apparatus involving the use of pressure to discharge the frozen product have been proposed, such proposals have not met with adoption by the trade for one reason or another, including inoperativeness, inability to obtain a satisfactorily salable product, inability of such proposed apparatus to produce a uniform or satisfactory incorporation of the desired and necessary percentage of air, and possibly the failure on the part of the makers and users of freezing and agitating equipment to fully realize the advantages obtainable from freezing as much of the water content as possible before permitting the cessation of stirring or agitation. It is obvious that the stiffer the product is upon being discharged from the freezing and agitating apparatus, the less the weight of the material can be depended upon to cause displacement of the air from the container as same is being filled with the product. It is also a fact that the increasing of the pressure upon a mass of partially frozen or semi-fluid material, such as ice cream, containing a substantial percentage of air or other gas, causes a definite and measurable loss in volume, due to the forcing out or the compressing of the gaseous content, and upon release of such pressure the mass will not re-expand to its original volume.

In the packing of ice cream it has also been proposed to place a batch of cream, which has been previously partly frozen in the common form of batch or atmospheric pressure type freezer, into a compressor or hopper from which it is subsequently drawn and/or forced through a nozzle into a container in which it is frozen to a stiff condition. The use of such hopper or compressor involves the hereinbefore mentioned reduction or loss of volume due to forcing out the gaseous contents. This type of apparatus has not been found to be practicable when the product is frozen to the degree of stiffness readily obtainable by the process and apparatus described in my hereinbefore mentioned patent, especially the type employing alternate drawing and forcing because such a relatively stiff product cannot be sucked through a small orifice.

In the packing of fruit juices, egg contents and certain other materials, the absence of voids is even more important, since air included in the container or package is often a cause for rapid deterioration of the product. By simultaneously stirring and partially freezing such products and discharging them into containers directly from the machine in which they are stirred and partially frozen in accordance with my invention, they are protected from substantial contamination by air, only the upper surfaces of the product in the container being exposed thereto. The subsequent capping of a filled container prevents the continued action of atmospheric air upon the material in the package since the container can be filled substantially completely without the inclusion of an air space between the cover and the body of the contents.

In the present invention, a processing machine is used in which the actual processing of the material may be carried on under pressure and from which the product is discharged directly into the container in such manner as to fill the same from the bottom up substantially free from voids. When applied to ice cream, the freezing and whipping in of overrun may be performed in the processing apparatus, the material being maintained under pressure. In this manner a greater percentage of overrun can be whipped into the material and the freezing can be carried to a more advanced stage than is possible with a batch freezer or a freezer from which the product is permitted to fall, using the force of gravity to assist in the forcing out of the air from the container in which the product is being packed. As the product is extruded into the container, the air, or other gas which has been whipped into the product, forms the overrun together with the expansion of the water content due to the partial freezing thereof, and this gaseous content is expanded upon release of the pressure to or towards that of the atmosphere. A greater overrun rather than a lesser overrun may be thereby obtained and the container is filled without visible or objectionable voids.

By the use of the process and apparatus broadly claimed in my patent above referred to, such a degree of stiffness may be obtained that if the ordinary five gallon can of ice cream be filled with the product discharged from the apparatus and completely inverted without the lid having been applied thereto, there will be no loss or flowing or dropping out of any of the contents.

Although it is possible with the so-called household ice cream freezer to freeze the material to such a degree of stiffness that it will not flow out of an open container when the same is inverted, these freezers will not permit the incorporation or retention of the desired air, especially if the product is agitated while this degree of stiffness is being obtained.

The household type of freezer is practically obsolete so far as the manufacture of commercial ice cream is concerned, partially for the above reason and partially because of its cumbersomeness and non-adaptability to commercial operation. If the product be frozen with such a type of freezer to a degree of stiffness which would render same relatively non-fluid, such material cannot be readily poured or forced out of the freezing container, but requires a dipping or cutting of the product from such container. This dipping causes a loss of volume and a material reduction in the quality of the product by making the same soggy and otherwise undesirable.

While the following specifications and attached drawing describe the process as particularly applied to the manufacture of ice cream, this description is not to be taken as limiting the scope of the invention, which may be obviously applied to a large variety of products.

Other objects and features of the invention and the full nature thereof will be apparent from the attached drawing and the following description and claims.

Fig. 1 is a side elevation of one form of apparatus for carrying out the invention, and Fig. 2 is a longitudinal section therethrough on a larger scale.

In the drawing there is shown a processing machine mounted upon the supporting base 10, having a platform 11 for supporting a cup 12 or any other receptacle for receiving the material or mix discharged from the machine. Mounted upon the base 10 and extending at an angle to the base thereof, there is a tubular cooling or processing barrel 13 having a power drive including a motor 14 mounted in a housing 15 and driving a shaft 16 through suitable reduction gears contained in a housing 17.

Mounted upon the support 10 there are supporting bars 18 having a supporting ring 19 mounted thereon in which there may be removably placed in inverted position a jar 20 for containing the mix to be processed. The mouth or discharge end of the jar 20 is adapted to extend into a reservoir 21 so that the mix contained therein remains at a constant level, thus providing a constant head for gravity feed through a ball valve 22 which is controlled by a rod 23 operated by a handle 24.

The reservoir 21 communicates by a valve controlled passage 25 with a cylinder 26 in which there is reciprocably mounted a piston 27 driven by means of a cam 29 on the shaft 16. The shaft passes through packing glands 28 mounted at the base of the cylinder. The lower end of the piston 27 is provided with a roller 30 adapted to engage or ride upon the periphery of the cam 29 for causing said piston to reciprocate within the cylinder 26. A spring 26a seated against a shoulder 27a on the piston 27 serves to return the piston on its downward stroke.

The head of the cylinder is provided with a vent 31 for admitting fluid, such as air, carbon dioxide or any other material, to a chamber 32. The head of the piston is provided with a ball valve 33 for controlling the passage of fluid from the chamber 32 to the passage 34 extending centrally and longitudinally of said piston. A passage 35 in the wall of the piston is controlled by a ball valve 36 and communicates with the passage 25 for admitting the mix to the central passage 34. On the upstroke of the piston, the fluid is compressed in the chamber 32 and is forced past the ball valve 33 into the passage 34 within the piston. Similarly a shoulder 27a compresses the mix in passage 25 and forces it past the ball valve 36 into the passage 34. On the return stroke the mix and fluid, if used, are discharged from the lower end of passage 34 to the lower end of a freezing, processing or temperature changing chamber 37. Said chamber is formed between parallel concentric walls spaced apart to only a very short distance to leave a thin passage therebetween. One wall is formed by the elongated tube and the other by the periphery of the shaft 38 which extends through said tube and is keyed to the driving shaft 16 so as to be rotated thereby.

The tubular wall of the chamber 37 is in spaced relation with a tubular wall 40 to form a brine chamber so that the brine surrounds said processing chamber from one end to the other. Around the wall 40 is insulation 39 and around the latter is the barrel 13.

After the mix and air, or other gas, if desired, are pumped by the action of the piston 27 into the bottom of the thin-annular freezing chamber 37, they are forced upwardly at an incline therein and continuously agitated and whipped by the action of the whipping blades 41 mounted on the rotating shaft 38. As the fluid and mix are whipped together and forced upwardly in said processing chamber, the mix is gradually cooled or frozen by the low temperature of the brine cooled wall of the chamber 37. Since a certain pressure is required to advance the frozen material through the chamber and since the action of the piston 27 is capable of forcing the mix and air into the processing chamber at a pressure high enough to so advance the material, it is evident that the processing in the chamber is carried out under pressure greater than atmospheric. The mix is cooled or frozen to the desired plasticity when it reaches the end of the chamber 37 and is discharged into a whipping chamber 42, where it is whipped without further cooling or freezing action since said chamber is not surrounded or cooled by the brine.

The product is forced from the whipping chamber through the nozzle 43 and a conduit 143 into any suitable container 12, such as a can, cup or mold. The pressure feed of the freezer, as distinguished from the usual gravity feed, enables a container to be filled from the bottom up by using the flexible tube or conduit 143, whereby the operator may project the end of said conduit into the container near the bottom thereof and withdraw the same as the container fills. Thus the air is forced from the top of the container which eliminates formation of air pockets caused by filling the container from the top. This is particularly desirable in filling molds.

For the purpose of controlling the fluid supply through the vent 31, a rotatable valve in the form of a collar 131 is mounted about the cylinder 26, said collar being provided with an elongated slot 132 disposed at an angle so that by the rotation of the valve collar through the medium of the operating handle 133 the area of the vent may be varied. Thus the fluid may be entirely shut off when the nature of the material being processed makes the addition of such fluid unnecessary or undesirable.

It will be noted that the blades 41 are in the nature of heavy U-shaped wire staples extending through suitable apertures in the shaft 38 and secured therein, the heads of the staples acting as paddles. The blades are positioned so as to approach the wall very closely, but are free from actual engagement therewith, thus preventing undue wear upon the surface, and preventing a film from accumulating upon the wall, but giving a desired whipping action to the mix while passing therethrough.

The brine is introduced through a pipe 44 to an annular recess 45 in the end fitting 46 so as to surround the processing chamber and pass about the wall thereof to an annular chamber 47 and a lower fitting 48, from whence it is discharged through a passage 49. To produce a uniform product it is advantageous to control the flow of the brine by the control mechanism such as that described and claimed in said Patent 1,783,864.

In the filling of a container by the apparatus herein described, the flexible connnection 143 is manually withdrawn from the container by the operator as the container is filled. It is apparent however that this operation can easily be performed mechanically or that the container may be gradually lowered to produce the same result. The important feature is that the container be filled from the bottom up.

In the freezing of fruit juices, eggs, and other materials in which the presence of, or contamination with, air is undesirable, such materials may be frozen and discharged from the machine without the encasement of air into the frozen material, since air may be excluded from the chamber, and since the discharge from the processing chamber into the container is effected in a closed conduit, and the entrainment of air into the product is avoided.

It is obvious that in connection with the processing of any materials that the use of the jar 20 may be dispensed with and such liquid may be supplied directly to the reservoir 21 in a manner to prevent the dissolving or entrainment of air into the liquid.

In the processing of ice cream, fruit juices, eggs and other products, it is usually desired that the product be further frozen or chilled. This is usually accomplished by placing the filled containers within a chamber maintained at a sufficiently low temperature to cause the additional setting or freezing, or until the required degree of hardness is reached.

Having thus described my invention, what I claim as new and desire to secure by Letters Patent is:

1. An apparatus for treating and packing material, including a processing chamber having walls spaced apart to form a comparatively thin passage therebetween, means for forcing a liquid or semi-liquid material through said chamber under superatmospheric pressure, means for cooling one of said walls to a low temperature to change the plasticity of the material during its flow, means within said thin space for agitating the material during its flow through said space, and a closed conduit attached to said chamber and adapted to continuously conduct the material from said chamber into a container adjacent to the bottom of the latter for filling said container from the bottom up with the material discharged from said chamber to prevent the formation of voids in the material in the container.

2. The method of preparing and packing material suitable for human consumption, which includes forcing a continuous stream of said material in a comparatively thin confined layer over a heat transfer surface, subjecting said surface to the action of a refrigerating medium to increase the stiffness of the material, mechanically agitating said material during its flow through said space, and continuously delivering the material of increased stiffness directly, without interruption of flow, into a container adjacent to the surface of accumulated material in the container to prevent atmospheric air from being entrained with the material as it is delivered into the container.

3. An apparatus for treating and packing material including a processing chamber, means for continuously forcing liquid or semi-liquid material through said chamber under superatmospheric pressure, means for cooling one of the walls of said chamber to a low temperature to change the plasticity of the material during its flow, means for agitating the material in said chamber while maintaining the material under said pressure, and a closed conduit attached to said chamber and adapted to continuously conduct the material from said chamber into a container adjacent to the bottom of the latter for filling said container from the bottom up with the material discharged from said chamber and to prevent voids in the material in the container.

4. The method of preparing and packing ice cream and other frozen comestibles, including comingling a gas and a liquid mix in predetermined relative proportions, continuously forcing a stream of the same through a processing chamber under superatmospheric pressure, cooling the stream to a low temperature while passing through said chamber to partially freeze the liquid to a plastic condition, and conducting the stream of aerated plastic material from said chamber into a container adjacent to the bottom of the latter and at successively higher levels to fill the container from the bottom up, and to spread the delivered material over the material already in the container and prevent voids in the material collected in the container.

CLARENCE W. VOGT.

DISCLAIMER 1,972,253.—*Clarence W. Vogt*, Louisville, Ky. PROCESS AND APPARATUS FOR PRE-
PARING AND PACKING FOOD PRODUCTS. Patent dated September 4, 1934.
Disclaimer filed January 25, 1940, by the assignee, *The Girdler Corporation*.

Hereby enters disclaimer of the subject matter of claims 3 and 4 of said Letters Patent.

[*Official Gazette February 13, 1940.*]